US011498565B2

(12) United States Patent
Cosfeld et al.

(10) Patent No.: US 11,498,565 B2
(45) Date of Patent: Nov. 15, 2022

(54) METHOD FOR ACTUATING A VEHICLE DRIVETRAIN

(71) Applicant: Bayerische Motoren Werke Aktiengesellschaft, Munich (DE)

(72) Inventors: Ralf Cosfeld, Stockdorf (DE); Manfred Fux, Vaihingen an der Enz (DE); Gerd Kraemer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 480 days.

(21) Appl. No.: 16/712,484

(22) Filed: Dec. 12, 2019

(65) Prior Publication Data
US 2020/0114913 A1    Apr. 16, 2020

Related U.S. Application Data

(63) Continuation of application No. PCT/EP2018/065680, filed on Jun. 13, 2018.

(30) Foreign Application Priority Data

Jun. 14, 2017    (DE) ..................... 10 2017 210 075.3

(51) Int. Cl.
*B60K 6/52* (2007.10)
*B60W 30/184* (2012.01)
(Continued)

(52) U.S. Cl.
CPC ............. *B60W 30/184* (2013.01); *B60K 6/52* (2013.01); *B60K 17/356* (2013.01);
(Continued)

(58) Field of Classification Search
CPC ........... B60W 30/184; B60W 2520/30; B60W 20/19; B60W 50/082; B60W 50/085;
(Continued)

(56) References Cited

U.S. PATENT DOCUMENTS 5,697,940 A    12/1997    Chu et al.
6,602,159 B1 *    8/2003    Williams .............. F16D 41/088
                                                     475/299
(Continued)

FOREIGN PATENT DOCUMENTS

CN    101362459 A    2/2009
CN    103381832 A    11/2013
(Continued)

OTHER PUBLICATIONS

Chinese-language Office Action issued in Chinese Application No. 201880015771.4 dated Jan. 26, 2022 with English translation (18 pages).
(Continued)

*Primary Examiner* — David J Hlavka
(74) *Attorney, Agent, or Firm* — Crowell & Moring LLP

(57) ABSTRACT

A method actuates a vehicle drivetrain of a vehicle having a drive unit, in particular an electric motor, wherein the drivetrain has at least one first partial drivetrain which is assigned to a first output unit which transmits a torque between the drive unit and the first output unit, and has at least one second partial drive train which is assigned to a second output unit which transmits a torque between the drive unit and the second output unit. When a positive torque is transmitted, a load is applied to the drivetrain in a first direction, and when a negative torque is transmitted, a load is applied to the drivetrain in a second direction opposed to the first direction. At least one pre-load device is provided which, when a predetermined positive torque limiting value is reached or when a predetermined negative torque limiting value is reached, pre-loads the first partial drivetrain in the (Continued)

first direction of the positive torque and pre-loads the second partial drivetrain in the second direction of the negative torque.

12 Claims, 5 Drawing Sheets

(51) Int. Cl.
*B60K 17/356* (2006.01)
*B60K 23/08* (2006.01)
(52) U.S. Cl.
CPC ..... *B60K 23/0808* (2013.01); *B60W 2520/30* (2013.01); *B60Y 2200/92* (2013.01); *B60Y 2400/82* (2013.01)
(58) Field of Classification Search
CPC ....... B60W 2540/10; B60W 2540/106; B60W 2540/215; B60W 2710/083; B60W 10/119; B60W 10/08; B60W 10/14; B60K 6/52; B60K 17/356; B60K 23/0808
See application file for complete search history.

(56) References Cited

U.S. PATENT DOCUMENTS

| | | | |
|---|---|---|---|
| 7,873,457 B2 * | 1/2011 | Christofl | B60T 8/175 |
| | | | 475/43 |
| 9,517,691 B1 | 12/2016 | Pritchard et al. | |
| 10,029,669 B2 | 7/2018 | Mao et al. | |
| 2007/0225889 A1 | 9/2007 | Morris | |
| 2009/0043465 A1 | 2/2009 | Tomita | |
| 2012/0022730 A1 * | 1/2012 | Maass | B60W 30/20 |
| | | | 180/65.265 |
| 2012/0220423 A1 | 8/2012 | Goeppert | |
| 2015/0314771 A1 * | 11/2015 | Dextreit | B60K 6/48 |
| | | | 180/65.265 |
| 2017/0210375 A1 | 7/2017 | Orlamuender | |

FOREIGN PATENT DOCUMENTS

| | | |
|---|---|---|
| CN | 106394229 A | 2/2017 |
| DE | 196 41 101 A1 | 4/1998 |
| DE | 197 48 665 A1 | 5/1999 |
| DE | 10 2014 205 136 A1 | 9/2015 |
| DE | 10 2016 113 899 A1 | 2/2017 |
| DE | 10 2016 121 015 A1 | 5/2017 |
| FR | 2 768 480 A1 | 3/1999 |
| FR | 3 005 921 A1 | 11/2014 |
| SE | 1351412 A1 | 5/2015 |
| WO | WO 2011/054326 A1 | 5/2011 |
| WO | WO 2017/044741 A1 | 3/2017 |

OTHER PUBLICATIONS

International Search Report (PCT/ISA/210) issued in PCT Application No. PCT/EP2018/065680 dated Sep. 27, 2018 with English translation (four (4) pages).
German-language Written Opinion (PCT/ISA/237) issued in PCT Application No. PCT/EP2018/065680 dated Sep. 27, 2018 (six (6) pages).
German-language Search Report issued in counterpart German Application No. 10 2017 210 075.3 dated Nov. 28, 2017 with partial English translation (12 pages).

* cited by examiner

METHOD FOR ACTUATING A VEHICLE DRIVETRAIN

CROSS REFERENCE TO RELATED APPLICATIONS

This application is a continuation of PCT International Application No. PCT/EP2018/065680, filed Jun. 13, 2018, which claims priority under 35 U.S.C. § 119 from German Patent Application No. 10 2017 210 075.3, filed Jun. 14, 2017, the entire disclosures of which are herein expressly incorporated by reference.

BACKGROUND AND SUMMARY OF THE INVENTION

The present invention relates to a drive train of a vehicle, and to a method for actuating a vehicle drive train.

A drive train of a vehicle usually connects a drive unit, for example an electric motor and/or an internal combustion engine, to at least one output unit, for example a wheel or an axle which is connected to the wheels. Since a drive train of this type is not a rigid structure, but rather has partials which can be moved with respect to one another, the drive train is subject to a certain rotational backlash that has to be passed through before a torque can be transmitted between the drive unit and the at least one output unit, that is to say, the drive train is actually subjected to load, with the result that a transmission of force can take place between the drive unit and the output unit.

It has been determined here that a torque characteristic from the drive unit to the output unit (traction mode) is called a positive torque, whereas a negative torque denotes a torque characteristic from the output unit to the drive unit (overrun mode). The torque reversal, that is to say the zero transition, is also called a load change. A change in the rotational direction of the drive train also takes place, however, in the region of said torque reversal. Said change in the rotational direction also requires, however, that the rotational backlash which is inherent to the drive train is taken up before a load can again be transmitted via the drive train, with the result that the elements of the drive train are all again subjected to load, that is to say are in contact. This taking up of the rotational backlash or bringing into contact of the elements can firstly entail a delay in the response behavior. That is to say, for example, that, although a driver of the vehicle has already requested a torque for acceleration (positive torque) at the drive unit, in order to accelerate the vehicle out of a braking operation (negative torque), the vehicle has to still first of all pass through the rotational backlash before the positive torque is actually transferred to the output unit, with the result that an acceleration takes place. Said delay can be perceptible to a driver. Secondly, the bringing into contact of the elements of the drive train can take place with a stress (load change stress) which is perceptible to the driver and can occur in a particularly perceptible manner precisely when passing rapidly through the rotational backlash. This is undesired.

It is therefore an object of the present invention to provide a drive train and a method for actuating a drive train, in the case of which the response behavior is improved and a load change stress is reduced.

In the following text, a drive train of a vehicle is presented, the drive train having at least one drive unit, in particular an electric motor, and at least one first and one second output unit. Here, the first and the second output unit can be a first wheel and a second wheel, or else also a first driven vehicle axle and a second driven vehicle axle. The drive train therefore has at least one first partial drive train which is assigned to the first output unit and which transmits a torque between the drive unit and the first output unit. In addition, the drive train has at least one second partial drive train which is assigned to the second output unit and which transmits a torque between the drive unit and the second output unit. Here, in the case of a transmission of a positive torque, the drive train or the partial drive trains are/is subjected to load in a first direction and, in the case of a transmission of a negative torque, the drive train or the partial drive trains are/is subjected to load in a second direction which is opposed to the first direction.

As mentioned above, a positive torque is usually transmitted when a torque is transmitted from a drive unit to an output unit (traction mode), whereas a negative torque denotes a torque characteristic from an output unit to a drive unit (overrun mode). The torque reversal, that is to say the zero transition in the torque characteristic, is also called a load change.

Furthermore, in order to avoid a load change stress or the delay in the response behavior of the drive train, it is proposed to provide a preload apparatus in the drive train, which preload apparatus, if a predefined positive torque limit value is reached or if a predefined negative torque limit value is reached, preloads the first partial drive train in the first direction of the positive torque and preloads the second partial drive train in the second direction of the negative torque.

Here, the positive torque limit value and the negative torque limit value are preferably arranged in a range around the zero transition of the torque characteristic, in which range it can be expected that a load change might take place. Said range is usually selected to be relatively small, for example in the order of magnitude of less than ±10 Nm.

By virtue of the fact that the preload device preloads the first partial drive train in the first direction in said range, whereas the second partial drive train is preloaded in the direction of the negative torque, it can be ensured, regardless of whether a load change is actually taking place or not, that the torque can be transmitted directly, without it being necessary for a rotational backlash of the drive train to first of all be passed through.

In accordance with a further advantageous exemplary embodiment, the preload apparatus is designed, furthermore, to preload the first partial drive train with a first preload force and to preload the second partial drive train with a second preload force. Here, the first and second preload forces can also be identical, however.

Here, the preload force can be selected, for example, in such a way that the rotational backlash of the drive train or of the partial drive trains is passed through in such a way that all the elements are in contact. It is also possible, however, to adapt the preload force in such a way that a friction-induced and inertia-induced threshold value is not quite yet exceeded, which threshold value represents the limit to an actual movement of the vehicle, for example, in the case of a positive torque. In the latter case, it is particularly advantageous if the preload forces are different, since the force for moving the vehicle is considerably greater than a force for moving an engine or a rotor of the electric machine.

In accordance with a further advantageous exemplary embodiment, a control unit is provided, furthermore, which actuates the at least one preload apparatus and which has a detection apparatus, furthermore, which detects a driving mode, the control unit fixing the positive and/or the negative torque limit value and/or the first and/or second preload force in a manner which is dependent on the detected driving mode. A driving mode can be understood, for example, to mean a response behavior of the vehicle, which response behavior is selected by the driver. For example, a sport driving mode can determine that the torque limit values cover a considerably greater range than in the case of a comfort driving mode. The reason for this is that a sporty driver often uses more rapid transitions between braking and accelerating than a driver who has selected a comfort mode. It is likewise advantageous if, in the case of a sporty driving behavior, the preload force is higher than in the case of a comfort behavior, since inertia or friction losses do not then first of all slow down the transmission of torque, for example, in the case of an acceleration. In a comfort-oriented or else consumption-optimized driving mode, a preload can also be provided, however, only when an actual load change is achieved, or the preload can be switched off completely. The reason for this is that the preload of the drive train entails an energy loss each time, since the preload device has to be loaded with energy.

Furthermore, it is advantageous if the detection device detects, furthermore, a torque value, and the control unit has, furthermore, an estimating unit which estimates on the basis of the detected torque value whether a torque reversal is taking place. An estimating unit of this type can carry out customary stochastic probability calculations which can also be based on previously stored torque characteristics. As a result, the response behavior of the vehicle can be improved further, and the torque limit values can be determined in an improved manner.

In addition, the control unit can be designed to monitor a vehicle pedal position and/or a vehicle pedal actuation, and/or to estimate a torque reversal from a determined vehicle pedal position and/or a determined vehicle pedal actuation, and/or to monitor a torque which is transmitted via the first and/or second partial drive train.

As a result, it can be determined or estimated simply whether a load change is taking place or not. Even if no load change should be taking place, the drive train is also prepared for said situation, since the drive train is preloaded not only in the direction of the load change, but rather also in the direction of the instantaneous torque characteristic.

In accordance with a further advantageous exemplary embodiment, not only one preload apparatus is provided, but rather each partial drive train has its own preload apparatus. This makes a particularly simple configuration of the pre-load device possible, since it has to provide a preload only in one direction. If, for example, in each case one preload device is provided on the front axle and rear axle, the preload device of the front axle can, for example, fundamentally provide a preload in the negative torque direction, whereas, for example, the preload device of the rear axle fundamentally preloads a torque in the positive direction.

It is advantageous here, in particular, if the preload device is configured as an electric motor. Electric motors make it possible to pass through and to subject the drive train to a load in the one or other direction in a manner which is rapid and accurate in terms of torque.

In accordance with a further advantageous exemplary embodiment, it is not only the preload device, but rather also the drive unit which is configured as an electric motor. Since a hybrid drive is often used in modern vehicles, or the vehicle overall is operated electrically, an embodiment with an electric motor as drive unit is advantageous.

Furthermore, the drive unit can at the same time integrally comprise the preload unit. This is preferred, in particular, if two drive units are provided, one drive unit being assigned to the first output unit and the second drive unit being assigned to the second output unit. Since the two drive units can provide sufficient torque, an embodiment of this type makes it possible that a response behavior of the drive train is ensured, which response behavior is particularly free from load change stress and rapid. In this way, a particularly sporty driving experience can be imparted. An embodiment of this type is particularly advantageous in the case of an all wheel drive vehicle which is driven in a hybrid or purely electric manner, in the case of which all wheel drive vehicle the electric motor optionally additionally acts at the same time as a preload apparatus.

A further aspect of the present invention relates to a method for avoiding a rotational backlash in a drive train of a vehicle, the drive train being configured as described above. The method comprises the steps:

determining if the positive and/or negative torque limit value are/is reached and/or a load change is achieved, and actuating of the at least one preload apparatus in such a way that, if the positive and/or negative torque limit value are/is reached and/or a load change is determined, it preloads the first output unit in the direction of a positive torque and it preloads the second output unit in the direction of a negative torque.

A further aspect of the present invention relates to a computer program product which has a program code which is configured to bring about the performance of the method on a computer.

A computer program product, such as a computer program medium, can be provided or delivered, for example, as a storage medium, such as a memory card, a USB stick, a CD-ROM, a DVD, or else in the form of a downloadable file from a server in a network. This can take place, for example, in a wireless communications network by way of the transmission of a corresponding file with the computer program product or the computer program medium.

Further possible implementations of the invention also comprise combinations which are not mentioned explicitly of features or embodiments which have been described above or will be described in the following text with regard to the exemplary embodiments. Here, a person skilled in the art will also add individual aspects as improvements or additions to the respective basic form of the invention.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 3A, 3B-6A, 6B are diagrammatic idealized torque-time characteristics in a drive train according to the invention.

DETAILED DESCRIPTION OF THE DRAWINGS

In the following text, identical or functionally identically acting elements are denoted by the same designations.

Figure 1:
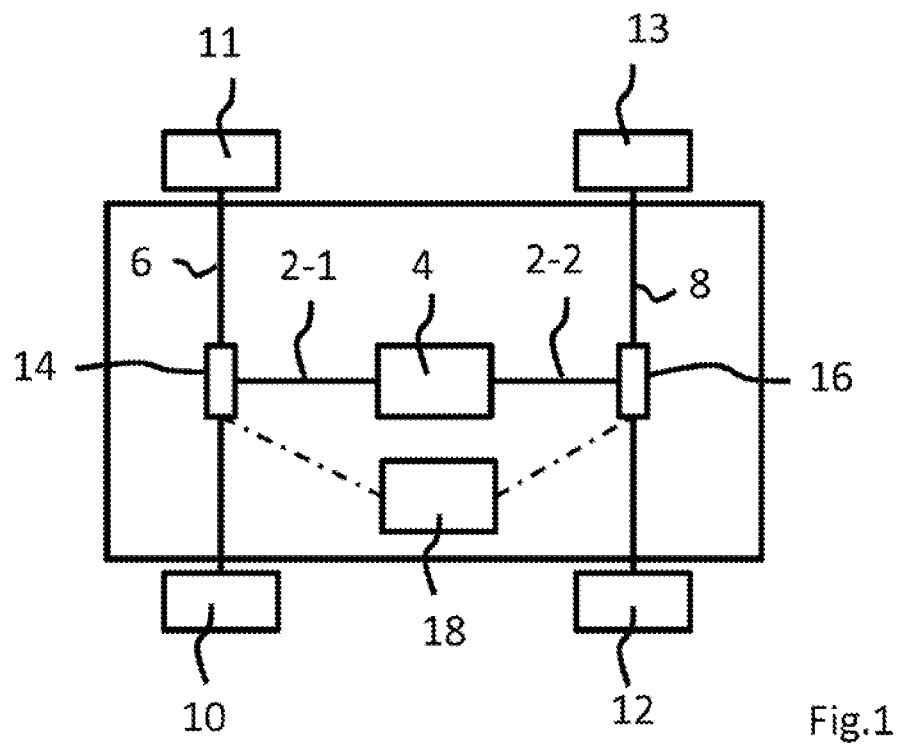
FIG. 1 is a diagrammatic illustration of a vehicle having a drive train in accordance with a first exemplary embodiment.

FIG. 1 diagrammatically shows a vehicle 1 having a first partial drive train 2-1 and a second partial drive train 2-2, via which a drive unit 4 and, in each case, one first and one second output unit 6, 8 are connected to one another. In the example which is shown, the first and the second output unit 6, 8 are in each case a vehicle axle which is driven by the drive unit 4, in order to apply a torque to the respective associated wheels 10, 11, 12, 13. The drive unit 4 can be an electric motor, but it is also possible that the drive unit 4 is configured as a hybrid drive unit, in the case of which an internal combustion engine and an electric motor interact, in order to provide either a purely electric drive or a combined drive. It is likewise possible that the drive unit 4 is a conventional internal combustion engine. In the case of modern vehicles, the internal combustion engine is usually assigned an electric machine which is responsible for the energization of various consumers in the vehicle, and which is driven by the internal combustion engine in the overrun mode, in order to generate current which is then stored in a battery (recuperation mode).

Further elements of the drive train 2 are not shown, such as a transmission or a differential, via which the torque is transmitted in the drive train 2. In addition to the elements which are shown, said elements which are not shown also produce a certain rotational backlash in the drive train, with the result that said rotational backlash has to be passed through first of all in the case of load being applied, before a torque can actually be transmitted between the drive unit 4 and the output units 6, 8 or the associated wheels 10 to 13.

In the case of an acceleration of the vehicle, it is determined here that a positive torque is transmitted, that is to say a torque characteristic takes place in a first direction. If the vehicle is braked or is not accelerated further, the torque characteristic in the drive train 2 reverses, with the result that a torque is transmitted from the output units 6, 8 back to the drive unit 4. Said reversed torque characteristic is usually used to operate the electric machine, which is assigned to the drive unit, or the drive unit itself in a recuperation mode, with the result that energy can be saved. The rotational backlash likewise first has to be passed through again for this driving mode, however, in order to apply a load to the drive train in the other direction.

In order to pass through the rotational backlash as rapidly as possible and without a load change stress, a preload device (a first and a second preload device 14, 16 in the case which is shown) is arranged. The preload devices, when a defined positive or negative torque limit value is reached, preload the first partial drive train 2-1 in a positive direction and the second partial drive train 2-2 in a negative direction. That is to say, for example, that, when a defined torque limit value is reached, the first partial drive train 2-1 and therefore the first output device 6 are preloaded in the direction of an acceleration (positive torque), whereas the second partial drive train 2-2 and therefore the second output device 8 are preloaded in the direction of a negative torque (recuperation mode). Said preload can ensure that, regardless of the direction in which the torque actually runs after the limit value is reached (that is to say, whether a load change is really taking place), the first and the second output unit can transmit the corresponding torque directly without a rotational backlash. As a result, the response behavior of the vehicle is improved firstly, since a rotational backlash does not have to be passed through first of all, and a load change stress is prevented secondly, since the drive train is already in contact in the correct direction.

Figure 2:
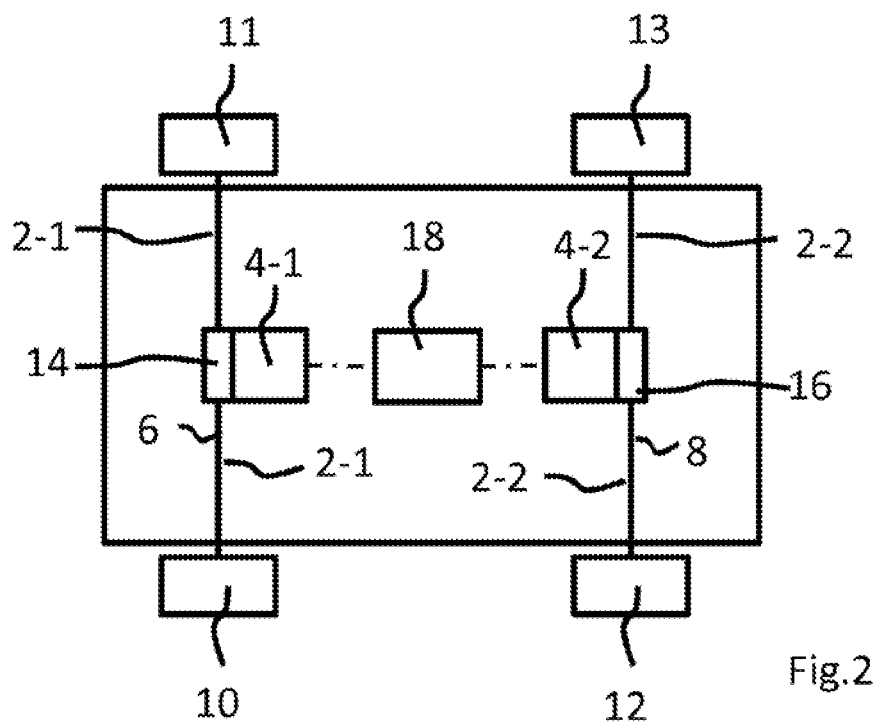
FIG. 2 is a diagrammatic illustration of a vehicle having a drive train in accordance with a second exemplary embodiment.
Figure 3A:
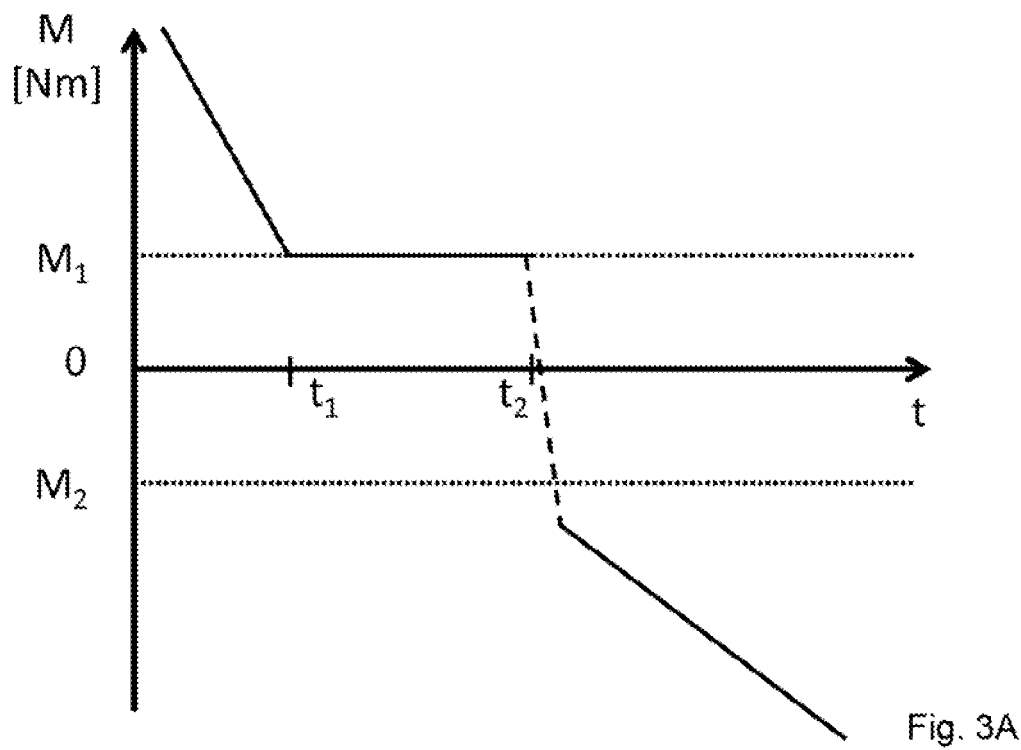
Figure 3B:
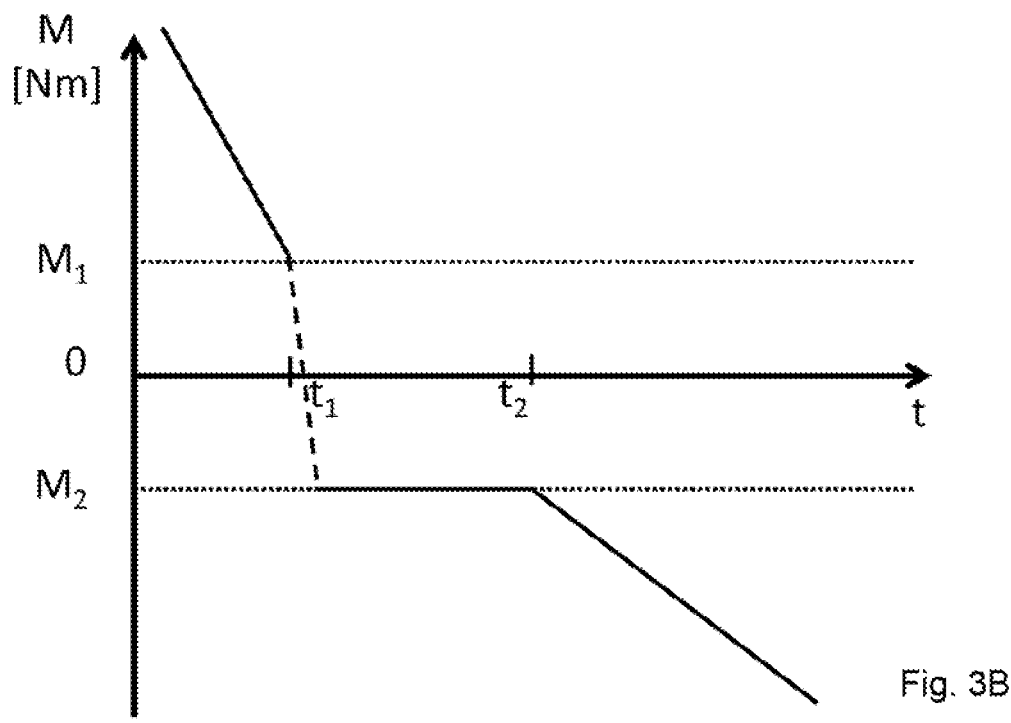

As shown in FIG. 2, it is thus possible, furthermore, that two drive units 4-1, 4-2 are provided in the vehicle 1, which drive units 4-1, 4-2 drive the output units 6, 8 in each case independently of one another, it also being possible in this case for the drive units 4-1, 4-2 and the preload devices 14, 16 to be configured as integral elements.

The preload of the partial drive trains 2-1, 2-2 which is provided by the preload device 14; 16 and, if they are configured in an integrated manner, at the same time by the drive unit is shown diagrammatically as a torque-time diagram in FIGS. 3 to 6. Here, the characteristic is shown in an idealized manner and does not make any claim to represent a real torque characteristic. The figures serve merely to illustrate the principle of the invention.

Figure 4A:
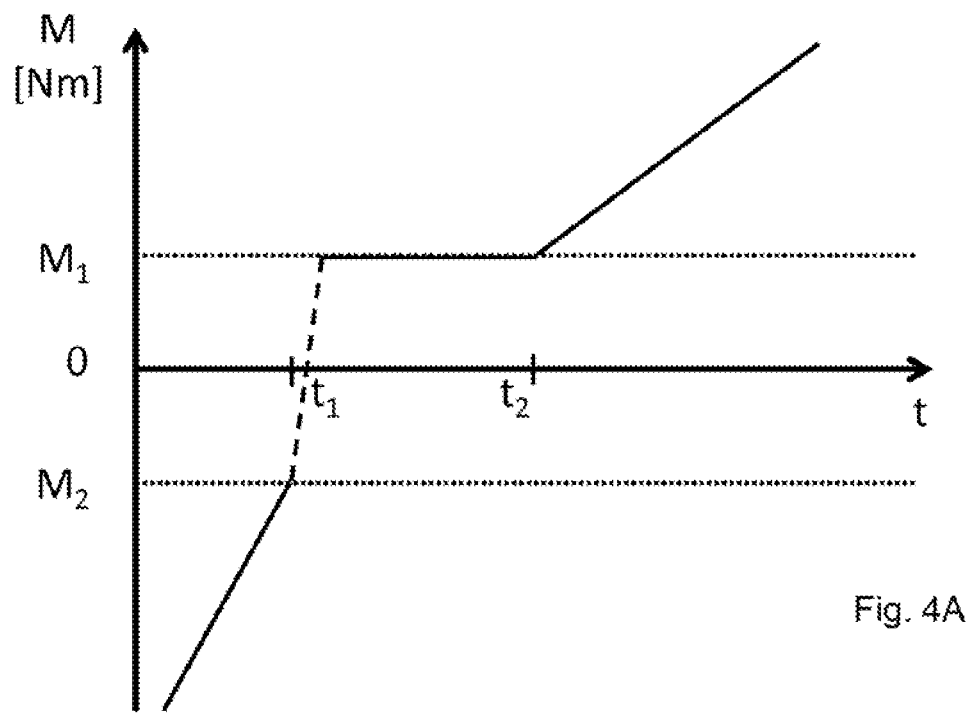
Figure 4B:
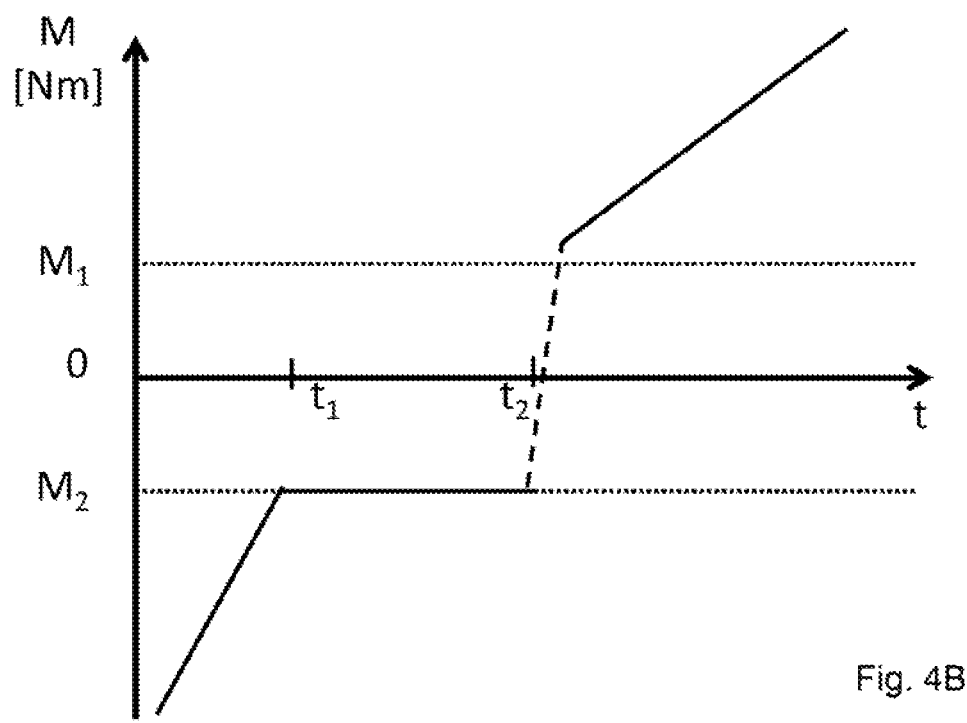
Figure 5A:
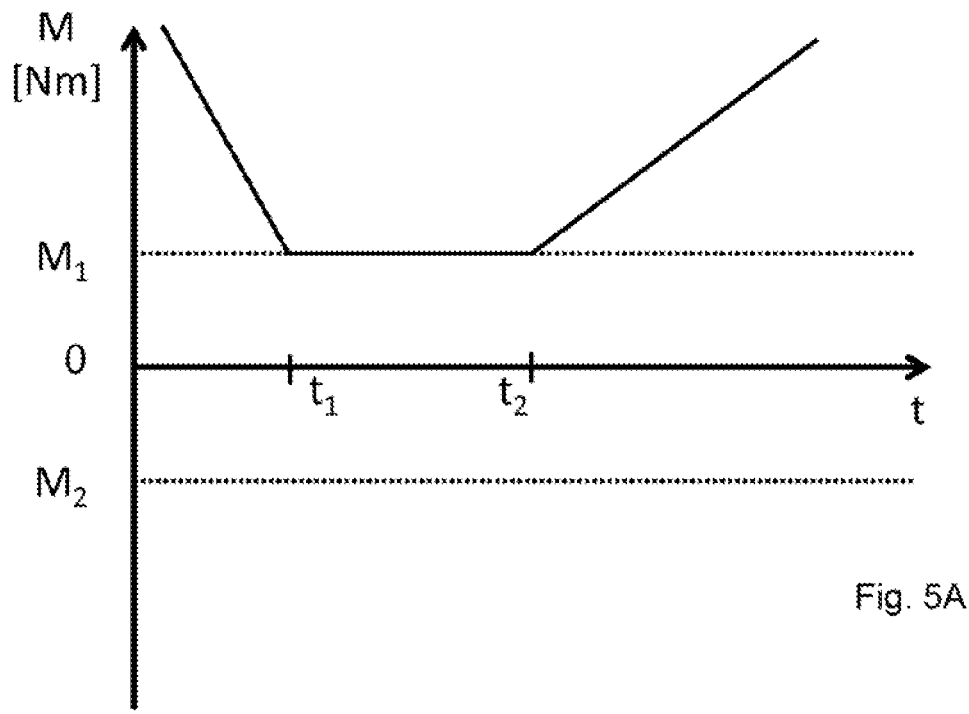
Figure 5B:
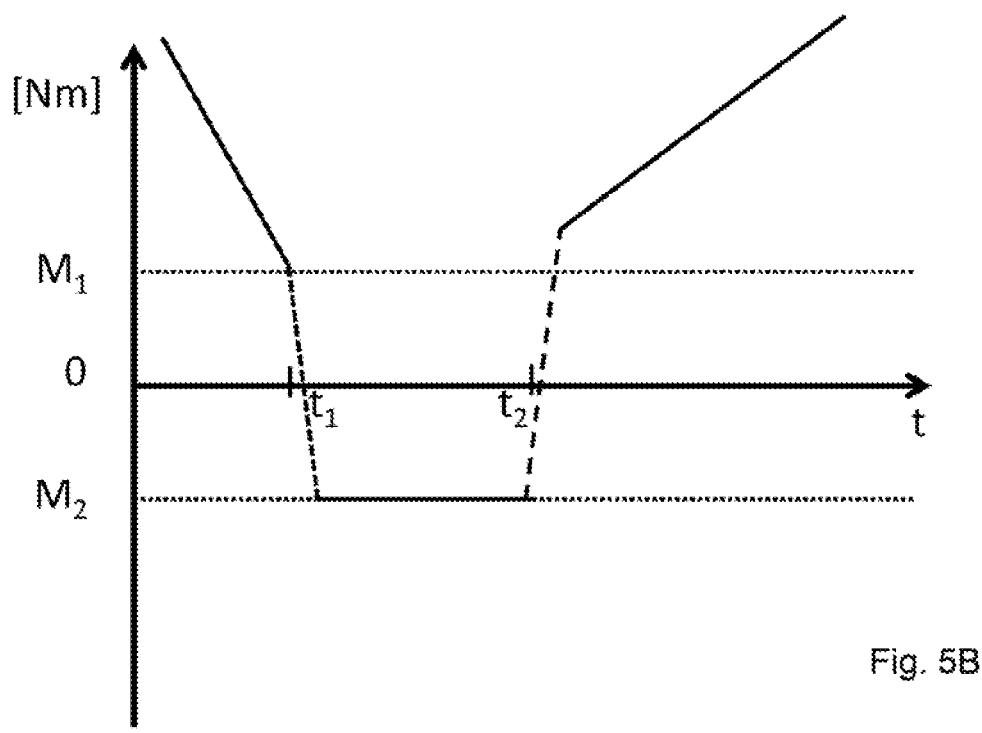
Figure 6A:
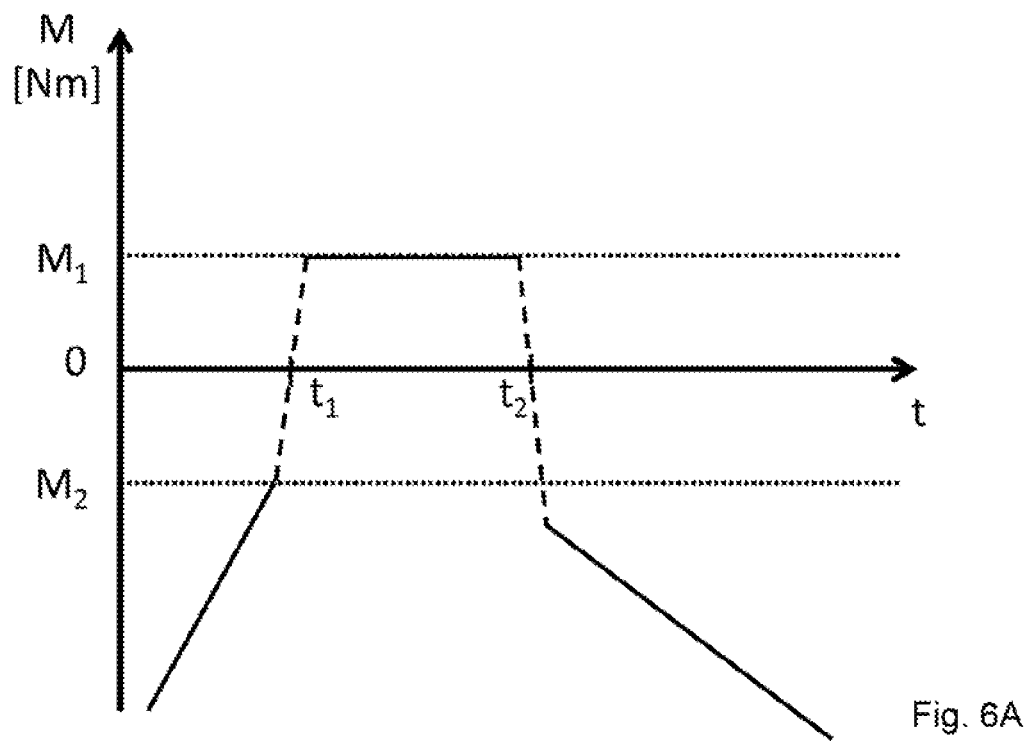
Figure 6B:
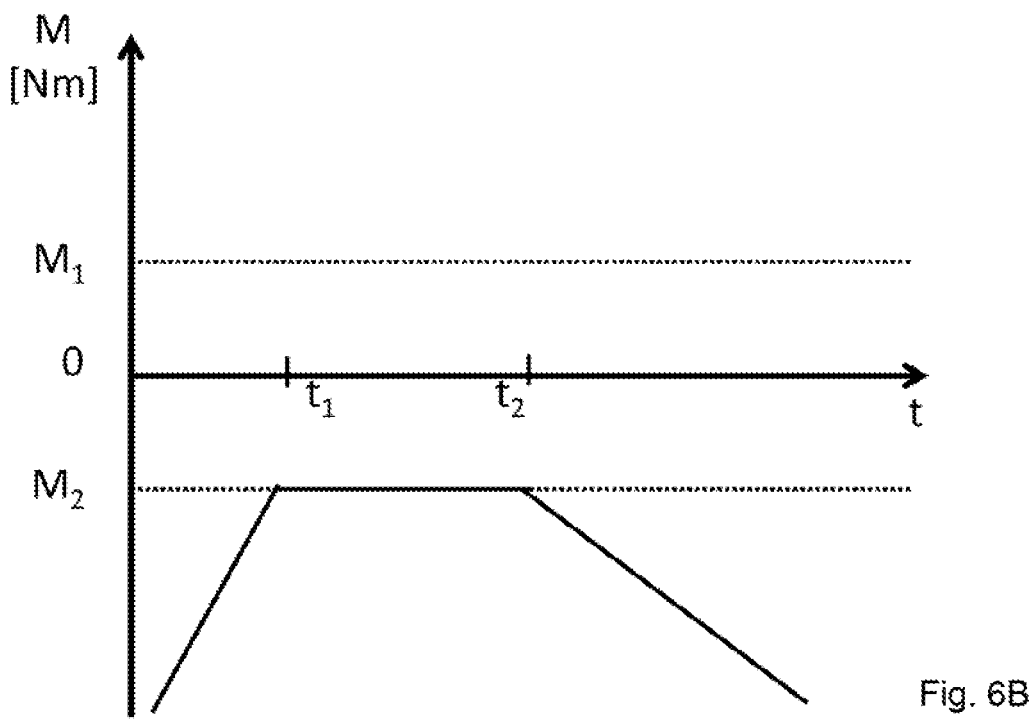

In FIGS. 3A, 3B to 6A, 6B, partial figure "A" in each case shows the torque characteristic in the first partial drive train 2-1, and partial figure "B" shows the torque characteristic in the second partial drive train 2-2. Here, FIGS. 3 and 4 in each case show a torque characteristic in the case of an actual load change, whereas FIGS. 5 and 6 show situations, in the case of which no load change is taking place, but the response behavior of the vehicle is optimized.

FIG. 3 shows a characteristic of the torque, in the case of which characteristic a driver changes from an overrun mode into a traction mode. In contrast, FIG. 4 shows the opposite situation, in the case of which a vehicle is to be accelerated out of a recuperation mode.

In the case of the transition from the overrun mode to the traction mode, the torque is reduced, as shown in the section up to $t_1$, until it reaches a positive torque limit value $M_1$. At the same time, the torque of the second drive unit is likewise reduced until the first torque limit value $M_1$ is reached. When said torque limit value is reached at the time $t_1$, the first partial drive train 2-1 is then actuated by means of the preload device 14 in such a way that it is preloaded in the direction of the positive torque characteristic. This can be achieved, for example, as shown diagrammatically in FIG. 3A, by virtue of the fact that the first drive unit is held at the torque value $M_1$.

In contrast, the second partial drive train 2-2 is preloaded in the direction of the negative torque characteristic, for example (as shown) by the second partial drive train 2-2 being loaded with a negative torque limit value $M_2$ and being held at the latter. If it is then clear at a time $t_2$ that a load change is actually taking place, the second partial drive train 2-2 is already preloaded in this direction and can directly transmit a torque. The first partial drive train 2-1 is then likewise moved to the negative torque characteristic. Since the second partial drive train 2-2 is already transmitting the torque in the correct direction, the transition in the first partial drive train 2-1, that is to say the passing through of the rotational backlash, can take place more slowly, with the result that no load change stress is produced.

This is advantageous, in particular, in the reversed case, that is to say in the case of an acceleration out of a recuperation mode, since (as shown in FIG. 4) the first drive unit can already directly transmit a positive torque via the preloaded first partial drive train 2-1 at the time $t_2$, and accelerates the vehicle. In contrast, the second partial drive train 2-2 is moved more slowly to the corresponding torque value and can then transmit a torque in the positive direction, likewise without causing a load change stress.

Even if the figures show the positive and the negative torque limit value $M_1$, $M_2$ as being spaced apart equally from the zero value, it can also be possible that they have different values. Furthermore, the preload force which corresponds in the cases which are shown to the torque limit value $M_1$, $M_2$ can also be higher or lower. It can be provided, in particular, that the preload force in the positive direction lies at a higher level than the preload force in the negative direction, since the drive or the acceleration of the vehicle requires a greater torque on account of inertia and friction than the driving of the drive unit. Thus, for example, the preload can be selected in such a way that, although the drive train is preloaded to a maximum extent in the positive or negative direction, it is the case that no torque which quite moves the vehicle or the drive unit prevails.

In addition to the avoidance of a load change stress, the response behavior of the vehicle can also be improved by way of the preload in the opposite direction of the partial drive train 2-1, 2-2. In the case of driving situations in which it is not always clear whether a load change is actually taking place or whether the driver is accelerating or braking further, it can occur that the drive train is possibly rotated in the "incorrect direction", in order to pre-empt a load change or a load change stress which is induced by rotational backlash. If the driver does not finish said load change, by accelerating again, for example, it can occur that the vehicle reacts to the corresponding driver's request in a delayed manner and/or a load change stress is even possibly initiated, although no load change has taken place. Driving situations of this type are shown in FIGS. 5 and 6, a load change into the recuperation mode being interrupted in FIG. 5, whereas FIG. 6 shows that a reduction of the recuperation mode also does not have to necessarily lead to an acceleration. It can also be achieved in said cases with the aid of the described drive train and/or actuating method that the response behavior of the vehicle is further improved.

Thus, in the case which is shown in FIG. 5, the first partial drive train 2-1 remains preloaded in the direction of the positive torque, with the result that an acceleration can take place directly at time $t_2$, without it first being necessary for the drive train to pass through the rotational backlash. Nevertheless, the second partial drive train 2-2 changes over into the state in which it is preloaded in the negative direction, and is then moved into the positive torque range again only when the time $t_2$ is reached.

This applies analogously to the case which is shown in FIG. 6, in the case of which the second partial drive train 2-2 remains preloaded in the negative direction, in order to then further transmit torque directly in the negative direction, whereas the first partial drive train 2-1 changes over into the positive preloaded torque state for the time period between $t_1$ and $t_2$.

A control unit 18 (see FIGS. 1 and 2), for example, can control whether and in which direction and with which preload force the respective preload takes place, which control unit 18 actuates both the preload apparatus 14 and the preload apparatus 16. It goes without saying that it is also possible to provide a dedicated control unit for each preload apparatus. Furthermore, the control unit 18 can detect parameters, such as an accelerator pedal actuation/position, in order to determine whether a load change is imminent. In addition or as an alternative, a load change of this type can also be deduced via an observation of the torque which is requested at the drive unit.

As a result of the preload according to the invention of the output units, not only can a load change stress be prevented in an appropriate load range around the zero point, but rather the response behavior in the case of a load addition (acceleration) or a load decrease (retardation or recuperation) can also be improved. Furthermore, the torque limit values and/or the preload forces of the preload can be adapted to different driving modes. It is thus possible, for example, to select a greater preload in the acceleration direction in the case of a sporty driving mode, with the result that the vehicle accelerates more rapidly and more directly. As an alternative, it is also possible to switch off the preload completely, in order to provide a particularly consumption-optimized mode.

LIST OF DESIGNATIONS

1 Vehicle
2 Drive train
2-1 First partial drive train
2-2 Second partial drive train
4 Drive unit
6 First output unit
8 Second output unit
10-13 Wheels
14 First preload device
16 Second preload device
18 Control unit
$M_1$ Positive torque limit value
$M_2$ Negative torque limit value The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive train of a vehicle, comprising:
   at least one drive unit;
   at least one first partial drive train which is assigned to a first output unit, and which transmits a torque between the drive unit and the first output unit; and
   at least one second partial drive train which is assigned to a second output unit, and which transmits a torque between the drive unit and the second output unit, wherein
   the drive train is subjected to load in a first direction in the case of a transmission of a positive torque, and the drive train is subjected to load in a second direction which is opposed to the first direction in the case of a transmission of a negative torque;
   at least one preload apparatus which, if a predefined positive torque limit value is reached or if a predefined negative torque limit value is reached, preloads the first partial drive train in the first direction of the positive torque and preloads the second partial drive train in the second direction of the negative torque.

2. The drive train according to claim 1, wherein the at least one preload apparatus preloads the first partial drive train with a first preload force and preloads the second partial drive train with a second preload force.

3. The drive train according to claim 2, further comprising:
   a control unit which actuates the at least one preload apparatus and which has a detection unit which detects a driving mode, wherein
   the control unit fixes the positive and/or the negative torque limit value and/or the first and/or second preload force of the at least one preload apparatus in a manner which is dependent on the detected driving mode.

4. The drive train according to claim 3, wherein the detection device detects, a torque value, and the control unit has an estimating unit which estimates, on the basis of the detected torque value, whether a torque reversal is taking place.

5. The drive train according to claim 3, wherein
the control device is configured to monitor a vehicle pedal position and/or a vehicle pedal actuation, and/or to estimate a torque reversal from a determined vehicle pedal position and/or a determined vehicle pedal actuation, and/or to monitor a torque which is transmitted via the first and/or second partial drive train.

6. The drive train according to claim 1, wherein
a first preload apparatus is provided on the first partial drive train, and
a second preload apparatus is provided on the second partial drive train.

7. The drive train according to claim 1, wherein
the at least one preload apparatus is an electric motor which is designed to pass through a rotational backlash in the partial drive train.

8. The drive train according to claim 6, wherein
at least two drive units are provided, the first drive unit connecting the first drive unit to the first output unit via the first partial drive train for a transmission of a torque, and the second drive unit connecting the second drive unit to the second output unit via the second partial drive train for the transmission of a torque.

9. The drive train according to claim 8, wherein
the first drive unit and the first preload apparatus are of integral configuration and/or the second drive unit and the second preload apparatus are of integral configuration.

10. The drive train according to claim 1, wherein
the at least one drive unit is an electric motor.

11. The drive train according to claim 1, wherein
the first output unit is a first wheel or a first driven vehicle axle, and
the second output unit is a second wheel or a second driven vehicle axle.

12. A method for avoiding a load change stress in a case of a transition from an overrun mode to a traction mode in a drive train of a vehicle, wherein the drive train comprises:
at least one drive unit;
at least one first partial drive train which is assigned to a first output unit, and which transmits a torque between the drive unit and the first output unit; and
at least one second partial drive train which is assigned to a second output unit, and which transmits a torque between the drive unit and the second output unit, wherein
the drive train is subjected to load in a first direction in the case of a transmission of a positive torque, and the drive train is subjected to load in a second direction which is opposed to the first direction in the case of a transmission of a negative torque;
at least one preload apparatus which, if a predefined positive torque limit value is reached or if a predefined negative torque limit value is reached, preloads the first partial drive train in the first direction of the positive torque and preloads the second partial drive train in the second direction of the negative torque,
the method comprising the acts of:
determining if a positive and/or negative torque limit value are reached and/or a torque reversal is achieved; and
actuating the at least one preload apparatus in such a way that, if the positive and/or negative torque limit value are reached and/or a torque reversal is achieved, it preloads the first partial drive train in the first direction of a positive torque and it preloads the second partial drive train in the second direction of a negative torque.

* * * * *